Sept. 13, 1966    F. V. MARTIN    3,272,527
THEFT PROOF SHOPPING CART
Filed Jan. 13, 1964
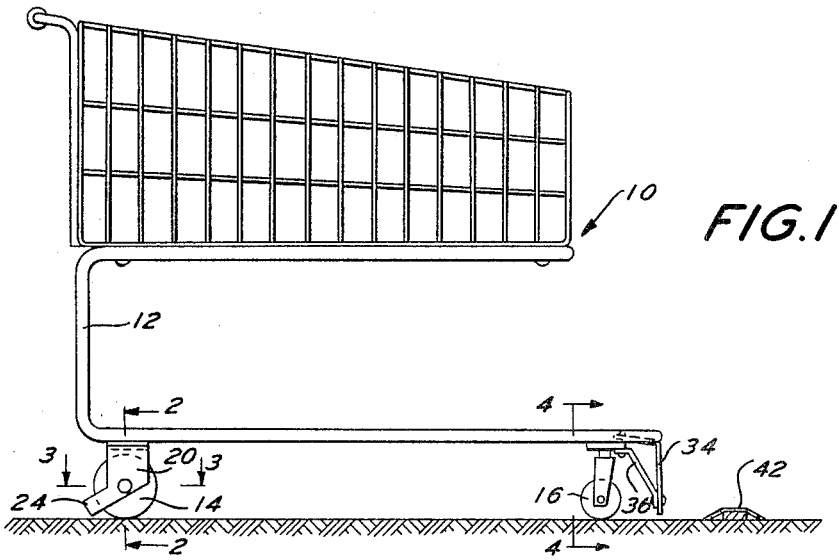
FIG.1
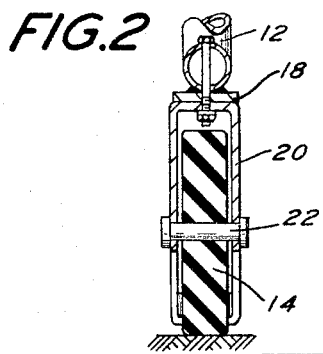
FIG.2
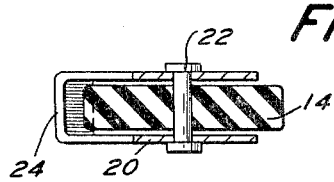
FIG.3
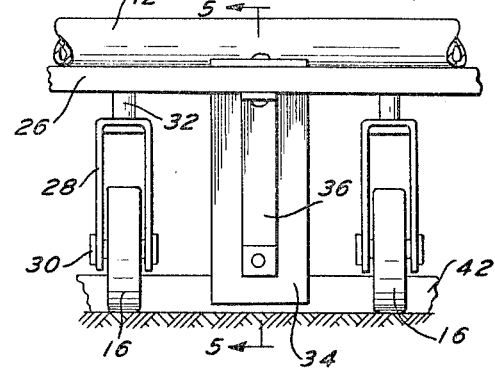
FIG.4
FIG.5
FIG.6
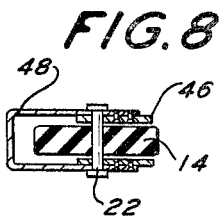
FIG.7    FIG.8
INVENTOR.
FRANK V. MARTIN
BY Arthur H. Seidel
ATTORNEY

United States Patent Office 3,272,527
Patented Sept. 13, 1966

3,272,527
THEFT PROOF SHOPPING CART
Frank V. Martin, 214 Roosevelt Blvd., Brigantine, N.J.
Filed Jan. 13, 1964, Ser. No. 337,214
1 Claim. (Cl. 280—33.99)

This invention primarily relates to means for use in conjunction with a shopping cart for confining the movement of the cart within an authorized area.

Supermarkets are faced with the acute problem of preventing the theft or unauthorized removal of shopping carts from their premises. Many shoppers who live close to a supermarket, and many who live much further away, wheel their purchased goods to their home in a shopping cart. Because of the inconvenience of returning the cart, many of these carts are abandoned after they have served the convenience of the user. The abandoned carts are found in streets or alleys and become a hazard to pedestrians and motorists.

Also, many carts are taken by children as play things or as acts of plain vandalism. These carts are usually dismantled and left in inaccessible places.

The cost of replacing stolen and damaged shopping carts involves a considerable sum of money over a protracted time period. For example, during the year 1962 estimated losses in the United States totaled approximately sixteen million dollars.

Accordingly, it is an object of this invention to disclose means mounted directly on the shopping cart for use with an abutment rail defining an authorized area whereby movement of the cart may be confined to said area by contact of said rail and means.

A further object of this invention resides in the fact that means mounted directly on the shopping cart is effective to prevent tilt of the cart necessary to override the abutment rail.

A more specific object of this invention is the provision of a shopping cart with an L-shaped bracket secured to and depending from one end of the cart which is so oriented as to strike an abutment rail defining the limits of an authorized area of movement for the cart.

Still another object of this invention is to provide an L-shaped bracket secured to and depending from one end of the cart which limits forward tilting of the cart by frictional contact of the bracket with the pavement or floor of the authorized area whereby the cart cannot be tilted to override the abutment rail.

Yet another object of this invention resides in the provision of a U-shaped extension on the rear wheel housings of the cart for striking the aforementioned abutment rail and thus preventing attempted backing of the cart outside of the authorized area.

A further object of this invention is to provide a U-shaped extension on the rear wheel housings of the cart for limiting backward tilting of the cart by frictional contact of the extension with the pavement or floor of the authorized area whereby the cart cannot be tilted to override the abutment rail.

A still further object of this invention resides in the fact that the front L-shaped bracket which restricts the tilting angle of the cart at the front end, and the U-shaped extensions on the rear wheel housings, which restrict the tilting angle at the rear end of the cart, render the cart immovable over an abutment rail defining an authorized area or a conventional curb stone or similar structure.

Another object of this invention is to disclose a U-shaped extension that may be easily mounted upon existing shopping carts to modify them in accordance with the principles of the present invention.

A further object of this invention resides in the fact that the means used to accomplish the objective of the present invention may be easily fabricated, comprise a minimum number of components, and perform their function efficiently.

Other objects will appear hereinafter.

For the purpose of illustrating the invention, there are shown in the drawing forms which are presently preferred; it being understood, however, that this invention is not limited to the precise arrangements and instrumentalities shown.

FIGURE 1 is a side elevational view of a shopping cart constructed in accordance with the principles of the present invention.

FIGURE 2 is an enlarged fragmentary cross sectional view taken along the plane indicated by the lines 2—2 of FIGURE 1.

FIGURE 3 is an enlarged cross sectional view taken substantially along the plane indicated by the lines 3—3 of FIGURE 1.

FIGURE 4 is an enlarged fragmentary sectional view taken substantially along the plane indicated by the lines 4—4 of FIGURE 1.

FIGURE 5 is a cross sectional view taken substantially along the plane indicated by the lines 5—5 of FIGURE 4.

FIGURE 6 is a cross sectional view of a slightly modified form of abutment rail which can be used in conjunction with the shopping cart of the present invention.

FIGURE 7 is an enlarged view in side elevation of a slightly modified form of housing extension which can be used to carry out the principles of the present invention.

FIGURE 8 is a cross sectional view taken substantially along the plane indicated by the lines 8—8 of FIGURE 7.

Referring now to the drawing in detail, the numeral 10 designates a shopping cart constructed in accordance with the principles of the present invention. The shopping cart 10 includes a frame 12 of conventional construction which is generally U-shaped in side elevation. Depending from the frame 12 are a pair of rear wheels 14 and a pair of front wheels 16 rendering the shopping cart 10 mobile.

Two rear wheel spacer plates 18 are connected to the tubular frame 12 at the rear thereof. Depending from each spacer plate is a rear wheel housing 20. The conventional housing for the wheel comprises a generally U-shaped yoke. An axle 22 extends between the arms of the yoke and mounts the wheel 14 for rotation.

The rear wheel housing 20 of the instant invention however, is cast or formed with an extension 24. The extension 24 is also generally U-shaped in cross section and extends substantially radially from the axle 22. The bight of the U-shaped extension 24 is parallel to and below the axle 22.

The front wheels of the shopping cart are each connected by a stem 32 to a support bar 26 extending transversely of the frame 12 and secured thereto. Connected to the stem 32 is a U-shaped yoke 28. Between the arms of the yoke 28 is an axle 30 which mounts a front wheel 16.

In accordance with the principles of the present invention, a generally L-shaped bracket 34 is secured to the front wheel support bar 26 intermediate the front wheel 16 by means of a rivet 40 or the like. A brace 36 is also secured to the front wheel support bar 26 and the L-shaped bracket 34 by means of a rivet 38 or the like.

The present invention contemplates that a rail such as 42 may be used to define an authorized area in which movement of shopping cart 10 is to be confined. For example, the rail 42 may be placed about the periphery of a parking lot in a shopping area or may define any part of a floor or outdoor paved surface.

The abutment rail 42 is constructed so that its highest portion above ground level is higher than the lowermost portions of the L-shaped bracket 34 and the extension 24. Therefore, if a shopping cart user attempts to take the cart beyond the authorized area defined by the abutment rail 42, the bracket 34 will strike the abutment rail and the extension 24 will prevent the bracket 34 from tilting high enough to clear the abutment rail 42 thereby precluding the removal of the cart from the authorized area. If the user attempts to back the cart over the abutment rail 42, the extension 24 of the rear wheel housing will strike the abutment rail 42 in a like manner and in this situation the L-shaped bracket 34 will prevent the extension 24 from tilting high enough to clear abutment rail 42.

An empty shopping cart 10 is often too cumbersome and heavy for most people to lift. When the cart is loaded, it is practically impossible for anyone to move it without wheeling it. Since the only way possible to clear the abutment rail 42 with a shopping cart equipped with the means of the present invention, is to physically carry the cart over the abutment rail 42 or over a curb stone or similar barrier, the removal of the cart from the authorized area is precluded. This renders the shopping cart 10 theftproof.

FIGURE 6 illustrates a slightly modified form of rail 44 which can be used in conjunction with the shopping cart of the present invention. The rail 44 is generally V-shaped with the apex of the V at a higher elevation than the lowermost portion of the bracket 34 and extension 24.

FIGURES 7 and 8 illustrate a manner in which existing rear wheel housings on a shopping cart can be modified in accordance with the principles of the present invention. The conventional U-shaped rear wheel housing is illustrated by the numeral 46. A separate U-shaped extension 48 may be rigidly connected to the axle 22 as illustrated in FIGURES 7 and 8. In order to compensate for different sizes of the wheel 14 and wear of the wheel 14 and/or the extension 48, a plurality of apertures 50 are provided in the arms of the extensions 48. In this manner, it is only necessary to reposition the axle 22 through one of the other apertures 50 to adjust the vertical height of the extension 48 with respect to the housing 46 or wheel 14.

In the embodiment of the rear wheel housing illustrated in FIGURES 1 to 3, in order to compensate for wear of the wheel 14, the axle 22 may be threaded eccentrically through the apertures in the arms of the housing 20.

It should thus be appreciated that by the employment of means as disclosed in the present invention, the movement of a shopping cart may be confined to an authorized area. Said means comprises a minimum number of components, namely three brackets and an abutment rail. Existing shopping carts may be readily adapted for use with the means disclosed herein. Great savings by supermarkets may be readily appreciated by using the principles and means of the present invention while still maintaining a high standard of customer service.

The present invention may be embodied in other specific forms without departing from the spirit or essential attributes thereof and, accordingly, reference should be made to the appended claim, rather than to the foregoing specification as indicating the scope of the invention.

I claim:

Apparatus comprising a shopping cart having a pair of spaced ends, a pair of wheels at each end of said cart, at least one wheel housing depending from one of said ends, an axle mounting one of said wheels within said housing, a substantially U-shaped extension on said wheel housing for confining the movement of the cart within a predetermined area, said extension being separable from said housing and vertically adjustable in respect to said housing, a bracket secured to and depending from the other end of said cart, said bracket being spaced substantially equidistant between the wheels on other end of said cart, said bracket being substantially L-shaped in cross-section, said bracket having a first laterally projecting leg and a second downwardly projecting leg extending substantially perpendicularly from said first leg, a brace, means for connecting one end of said brace to said one end of said cart and the other end of said brace to said second leg of said L-shaped bracket, the lower most portion of said second leg of said bracket and said U-shaped extension being at an elevation lower than the highest portion of an abutment rail defining the limits of said predetermined area, whereby attempted movement of said cart outside of said area will be precluded by the contact of said second leg of said bracket and said U-shaped extension with said abutment rail.

References Cited by the Examiner

UNITED STATES PATENTS

| | | | |
|---|---|---|---|
| 2,823,042 | 2/1958 | Gelbond | 280—33.99 |
| 2,964,140 | 12/1960 | Berezny | 280—33.99 X |
| 3,083,398 | 4/1963 | Swalm. | |
| 3,186,728 | 6/1965 | Turlington | 280—33.99 |

BENJAMIN HERSH, *Primary Examiner.*

MILTON L. SMITH, *Examiner.*